US006341915B1

(12) United States Patent
Kammel (10) Patent No.: US 6,341,915 B1
(45) Date of Patent: Jan. 29, 2002

(54) RUBBER-CUSHIONED BALL JOINT WITH A BEARING GEOMETRY WHICH IS OPTIMIZED WITH REGARD TO TENSION

(75) Inventor: Helmut Kammel, Damme (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/446,498

(22) PCT Filed: Apr. 21, 1999

(86) PCT No.: PCT/DE99/01200

§ 371 Date: Dec. 21, 1999

§ 102(e) Date: Dec. 21, 1999

(87) PCT Pub. No.: WO99/55543

PCT Pub. Date: Nov. 4, 1999

(30) Foreign Application Priority Data

Apr. 23, 1998  (DE) .......................................... 198 18 161
Jul. 22, 1998  (DE) .......................................... 198 32 956

(51) Int. Cl.⁷ .............................. F16C 11/00; F16D 1/12
(52) U.S. Cl. ........................................ 403/135; 403/124
(58) Field of Search ................................ 403/122, 134, 403/135, 133, 132, 124, 125

(56) References Cited

U.S. PATENT DOCUMENTS 3,843,272 A    10/1974  Jorn .......................... 403/132
4,613,251 A  * 9/1986  Bellamy et al. ............. 403/135
5,284,398 A  * 2/1994  Sakai ......................... 403/135
6,099,192 A  * 8/2000  Free .......................... 403/114
6,113,302 A  * 9/2000  Buhl ......................... 403/133

FOREIGN PATENT DOCUMENTS

| DE | 28 38 391 A1 | 3/1980 |
| DE | 33 46 665 A1 | 12/1983 |
| DE | 86 20 178 U1 | 3/1988 |
| FR | 2 634 839 A1 | 2/1990 |
| FR | 2 649 171 A | 1/1991 |

* cited by examiner

Primary Examiner—Lynne H. Browne
Assistant Examiner—John B. Walsh
(74) Attorney, Agent, or Firm—McGlew and Tuttle, P.C.

(57) ABSTRACT

A rubber-mounted ball-and-socket joint with stress-optimized bearing geometry is provided. The bearing geometry of a ball-and-socket joint mounted in a rubber-metal bearing is changed such that a sufficiently great pivot angle is guaranteed for the pivot pin and the surface of the elastomer is enlarged at the same time to prolong its life. The bearing is extended beyond the radius of the joint ball on its side located opposite the pivot pin projecting from the bearing. The fulcrum point of the bearing and the fulcrum point of the pivot pin mounted in the inner part having an offset in relation to one another in the axial direction, wherein the inner and outer parts of the bearing are conically expanded. The rubber-mounted ball-and-socket joint may have, on at least one side, at least one insert with a Shore hardness lower than that of the elastomer. The insert may be inserted into the elastomer.

24 Claims, 6 Drawing Sheets

RUBBER-CUSHIONED BALL JOINT WITH A BEARING GEOMETRY WHICH IS OPTIMIZED WITH REGARD TO TENSION

FIELD OF THE INVENTION

The present invention pertains to a rubber-mounted ball-and-socket joint, whose inner part is isolated from the outer part by an elastomer and in which a pivot pin having a joint ball at its end is mounted in the inner part.

BACKGROUND OF THE INVENTION

Bearings and joints used for the chassis suspension in the automobile industry have been known to be stressed particularly strongly by shearing forces, vibrations and acceleration forces. It has therefore been known that vibrations caused by unevenesses of the road surface can be damped by the use of elastomers in the bearings and joint bodies. An improvement in acoustics, i.e., noise insulation against the running noise caused by the vibrations, is also achieved at the same time if the elastomers are selected judiciously.

For example, a rubber bearing with a special geometry has been known from DE 28 38 391, in which the jacket surfaces of the inner and outer bearing parts extend obliquely in relation to the bearing axis. As a result, a kind of sliding ramp is formed according to the teaching of this document, as a result of which the forces, which are generated during travel in curves and are axially introduced into the bearing, lead to a radial displacement between the outer and inner bearing parts and consequently to a pivoting of the bearing used for a wheel guide member.

Furthermore, an elastic bearing with restricted guidance has been known from DE 33 46 665. A specially shaped and pretensioned joint body consisting of an elastic material is inserted in the bearing described between an inner sleeve and an outer sleeve of the bearing. Restricted guidance is achieved during cardanic deflecting movements due to the design of the joint body.

The use of ball-and-socket joints has been known for articulated connections of parts of the wheel suspensions in motor vehicles. Both the housing and the pivot pin of the ball-and-socket joint are usually connected rigidly to the chassis parts during the insertion of the bearings, as a result of which shocks and vibrations would be undesirably transmitted directly to the chassis. It has therefore been known from, e.g., the German Utility Model G 86 20 178.6 that the drive and braking vibrations that occur can be damped by the use of a rubber bearing. In the solution described, a rubber-metal bearing which comprises an inner sleeve, an outer sleeve connected to the chassis and a rubber layer inserted between the inner sleeve and the outer sleeve, is pressed onto the housing jacket of the ball-and-socket joint, which housing jacket has an approximately cylindrical shape. Because of the enormous stress on the rubber, it is desirable to provide the largest possible contact surfaces for the elastomer material on the inner part and the outer part to prolong the life of the bearing. However, this is opposed by the limited bearing geometry of such a bearing for a ball-and-socket joint, which geometry arises, aside from the need to save space, from the fact that the pivot pin must always be mounted pivotably over a sufficiently large angle.

SUMMARY AND OBJECTS OF THE INVENTION

The technical problem to be solved by the present invention is therefore to change the bearing Do geometry of such a rubber-mounted ball-and-socket joint such that a sufficiently large pivot angle is guaranteed for the bearing journal and the contact surfaces for the elastomer material on the inner part and the outer part are at the same time enlarged to prolong their life.

It is an object of the invention to address this technical problem.

It is another object of the invention to provide a rubber-mounted ball-and-socket joint that is rugged in construction and economical to manufacture.

According to the invention, a rubber-mounted ball-and-socket joint is provided with stress-optimized bearing geometry. The joint has an axially symmetrical bearing, whose inner part is insulated against the outer part by an elastomer, and a pivot pin mounted in the inner part with a joint ball provided at its end. A fulcrum point of the bearing extends beyond the radius of the joint ball on its side located opposite the pivot pin projecting from the bearing. A fulcrum point of the pivot pin mounted in the inner part and the fulcrum point of the bearing have an offset X in relation to one another in the axial direction, wherein the outer contour of the inner part of the bearing is conically expanded with a slope angle β with respect to the bearing axis and the outer and inner contours of the outer part are conically expanded with a slope angle χ with respect to the bearing axis on the side of the extension of the bearing.

By extending the bearing geometry on the side opposite the pivot pin, an offset is brought about according to the present invention between the axis of rotation of the bearing and the axis of rotation of the joint. The extension of the bearing leads to an enlargement and consequently to prolonged life of the elastomer. However, the extension of the bearing in the case of radial forces acting correspondingly would lead to an undesired torsion of the inner part of the bearing in the outer part in a prior-art bearing geometry. This is counteracted according to the present invention by the conical shape of the bearing on the side of its extension. The consequence of the offset between the axes of rotation and the simultaneous conical shape of the bearing is a supporting action inside the bearing with respect to forces that act radially and consequently cause torques, as a result of which the load-bearing capacity of the bearing with respect to the torques that act increases.

According to the present invention, the outer contour of the inner part of the bearing is conically expanded with a slope angle β and the outer and inner contours of the outer part are conically expanded with a slope angle χ against the bearing axis.

According to another embodiment of the present invention, the outer contour of the inner part is expanded conically in the direction of the extension of the bearing, beginning approximately in the area of the axis of the bearing.

The height of the elastomer that is favorable for the torques that act can be brought about particularly advantageously by selecting specific ratios of the slope angle of the outer contour of the inner part to the slope angle of the outer part and by selecting a shape of the elastomer that is adapted to it. An advantageous embodiment of the bearing according to the present invention is therefore obtained by the slope angle of the conical expansion of the outer contour of the inner part being smaller than the slope angle for the expansion of the outer part. As a result, the height of the rubber body will be greater in the outer area of the bearing than in the center of the bearing relative to the longitudinal axis of the bearing. The greater spring excursion in the outer area of the bearing and the forces that occur there are thus taken into account in a particularly advantageous manner. Taking into account the loads on the bearing, which are due to the particular application, it is advantageous for the slope angle of the inner part and the outer part being varied from one area to the next corresponding to another embodiment of the bearing according to the present invention. As a result, the height of the elastomer can be optimally adapted to the course of forces actually occurring in the bearing corresponding to the particular application. The provision of recesses at individual points of the elastomer also makes it possible to set the height of the elastomer or rubber corresponding to the particular load. A particularly advantageous embodiment of the bearing has fall-out protection, which is achieved by the maximum external diameter of the inner part of the bearing being larger than the maximum internal diameter of the outer part of the bearing. To better absorb forces acting axially and to avoid tensile stresses that reduce the service life, another embodiment of the bearing according to the present invention has a stop face for the inner part on the front side located opposite the projecting pivot pin. The present invention also covers a bearing geometry in which the inner part and the outer part expand conically on both sides.

A rubber-mounted ball-and-socket joint having the above-described technical features was further improved to the extent that at least one insert with a Shore hardness lower than that of the elastomer is inserted on at least one side of the ball-and-socket joint. Consequently, a soft elastic insert, whose compressibility is several times that of the basically incompressible elastomer accommodating the insert, shall be provided according to the present invention. The stresses that occur especially at the bearing ends in the elastomer and lead to undesirably great deformations in the elastomer can be reduced as a result, so that the life of a ball-and-socket joint with an insert according to the present invention is further prolonged. The properties of the bearing are improved by the design according to the present invention without having to make any design changes, especially the dimensions.

In another embodiment of the present invention, a plurality of inserts may be arranged distributed over the circumference of the elastomer. Nearly any vehicle-specific mounting characteristic can be achieved as a result. The insert or inserts may be vulcanized into the elastomer or be inserted into the finished elastomer later.

To prevent the insert from separating spontaneously from the elastomer, it may also be bonded to the elastomer or be fixed in the elastomer with an additional, e.g., wedge-shaped securing element, which is inserted between the elastomer and the insert.

Moreover, provisions are made in another embodiment of the present invention for manufacturing the insert from a plurality of components, which are connected to one another, which may be connected to one another by a press fit or according to a prior-art fitting process, and at least one of which has a high roughness. Thus, frictional engagement, which counteracts the spontaneous separation of the insert from the elastomer, is achieved between the insert and the elastomer on at least one contact surface.

It is also possible to provide the insert, of which there is at least one, with recesses in some areas to influence the mounting characteristic.

If the insert is to be inserted into the finished elastomer later, it is also advantageous to provide a radially directed material accumulation, which engages a complementary shaped recess of the insert, of which there is at least one, at least in some areas to secure the insert in the elastomer. A spontaneous separation of the insert from the elastomer is also prevented from occurring by this design according to the present invention in a simple manner.

To facilitate the mounting of the insert, the insert, of which there is at least one, may also be chamfered on its edge area on the inside of the joint.

The above-mentioned features of the present invention and the features yet to be explained below may, of course, be used not only in the combination specifically indicated, but in other combinations as well or alone without going beyond the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
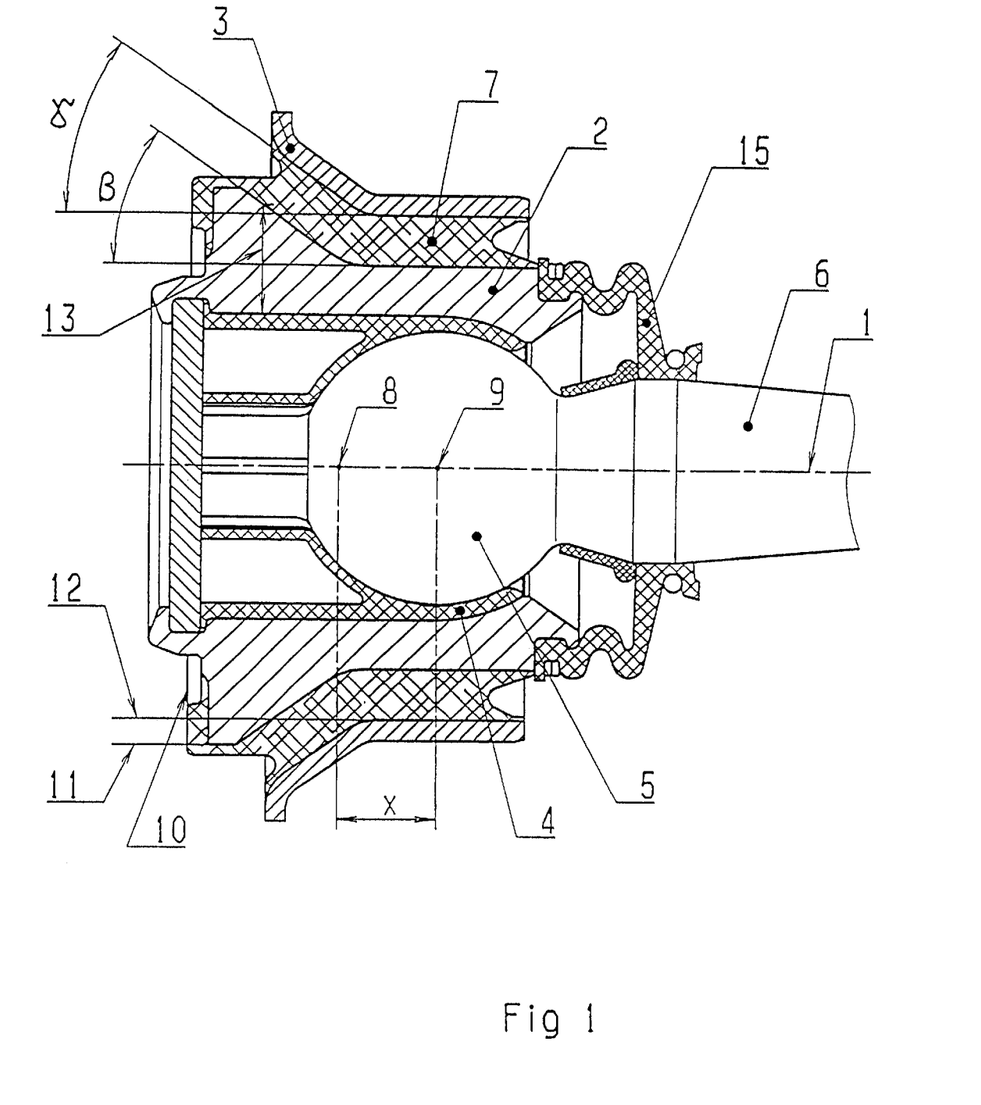
FIG. 1 is a sectional representation of the bearing according to the present invention.

Referring to the drawings in particular, FIG. 1 shows the geometry of the bearing according to the present invention based on a sectional representation with a section through the bearing axis 1. A bearing according to FIG. 2, in which the fulcrum points 8, 9 of the bearing and of the joint coincide in space relative to the axial direction, has been hitherto known for ball-and-socket joints from the state of the art. With the joint ball 5 provided at its end, a pivot pin 6 is mounted in the bearing shell 4 of the inner part 2 of a rubber-metal bearing. This inner part 2 also forms the housing of the ball-and-socket joint at the same time. An elastomer 7 is inserted in the known manner between the inner and outer parts 2, 3 of the bearing. The pivot pin 6 of the ball-and-socket joint can pivot out at an angle α corresponding to the forces acting on it radially. To preserve the value of the pivot-out angle α, an extension of the bearing on the side of the pivot pin 6 cannot be considered. The bearing according to the present invention was therefore extended on the side opposite the projecting pivot pin 6. Due to this extension, there is an offset X between the fulcrum point 8 of the bearing and the fulcrum point 9 of the ball-and-socket joint.

To avoid tensile stresses in the elastomer 7 or the rubber, a stop face 10 is formed for the inner part 2 of the bearing on the front side of the bearing extension, as is apparent from FIG. 1. Due to this stop face and the conical shape of the bearing, axial forces are absorbed in a manner favorable for the rubber. In addition, a favorable, uniform stress distribution is obtained in the elastomer 7 with respect to the radial forces that act.

Figure 2:
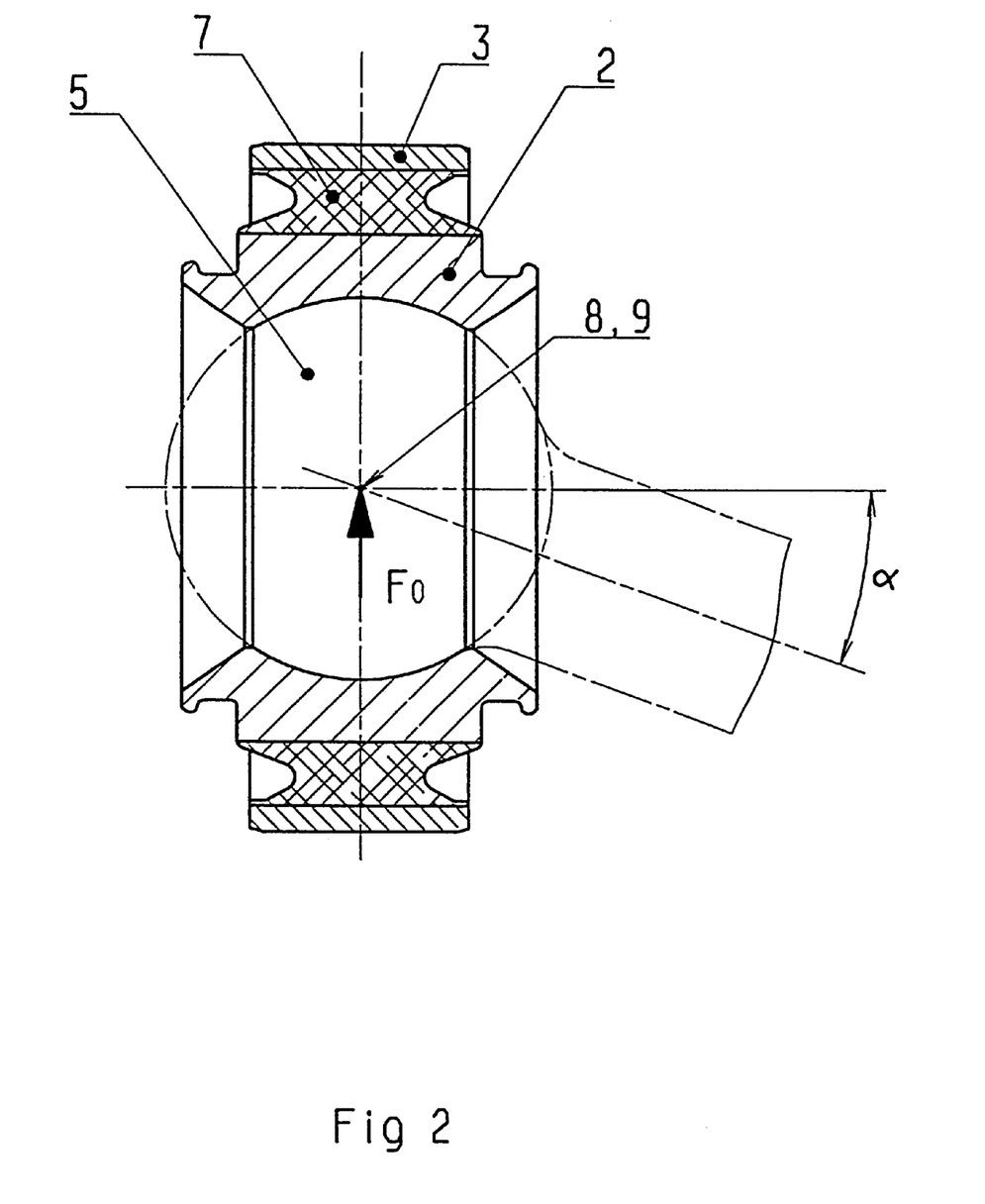
FIG. 2 is a sectional representation of a rubber-mounted ball-and-socket joint according to the state of the art.

In the case of FIG. 2, an undesired torsion of the inner part 2 of the bearing in the outer part 3 would occur in the case of a bearing extension on one side with the bearing geometry being otherwise maintained unchanged at the same time upon the introduction of stronger radial forces. This is due to the fact that the bearing is exposed to higher loads due to the torques that occur as a consequence of the offset X between the fulcrum points 8, 9.

Figure 3:
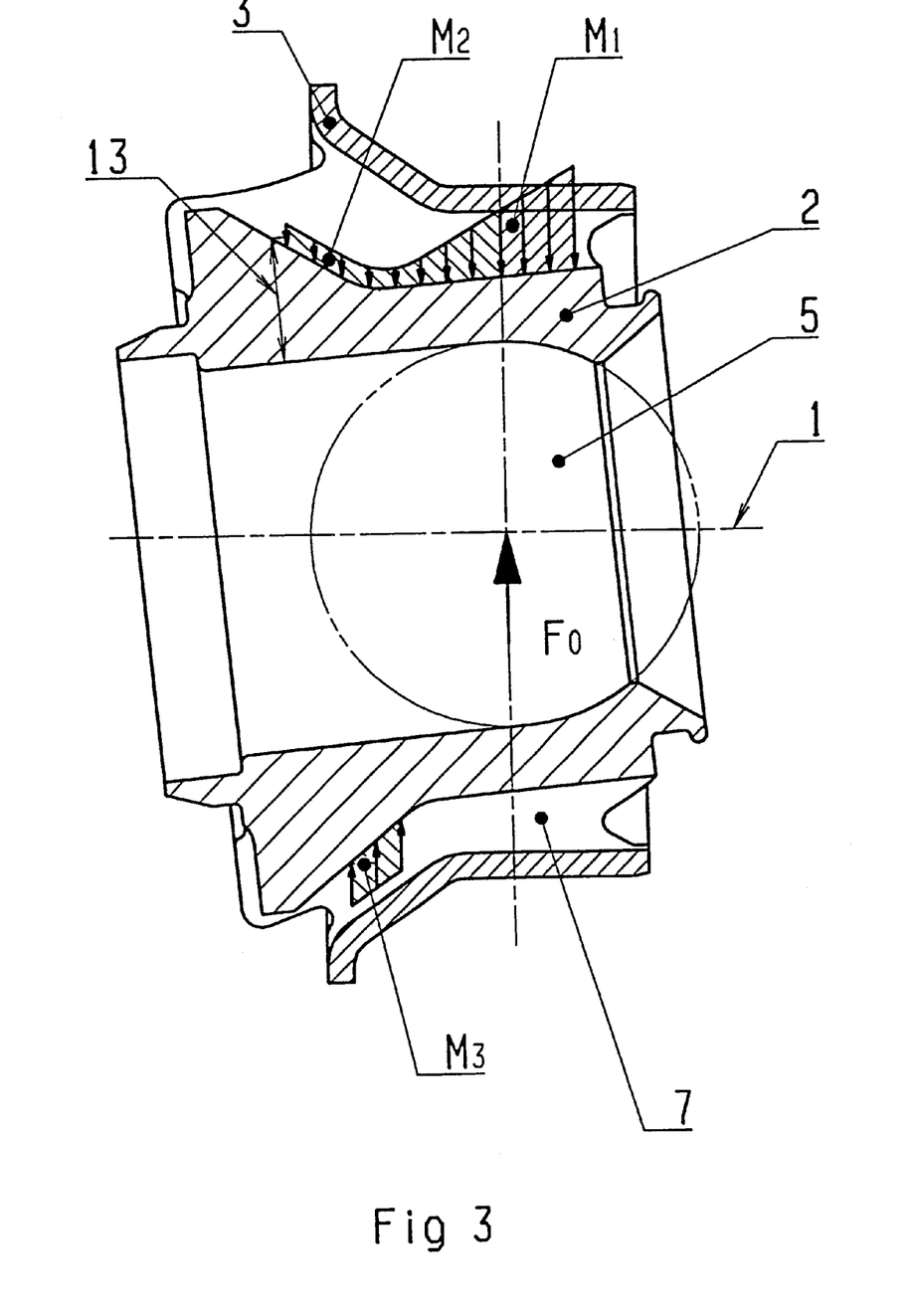
FIG. 3 is a sectional representation of the bearing of the invention, illustrating the forces and torques that occur on the bearing.

The forces and torques that occur on the bearing are illustrated in FIG. 3. The tendency of the inner part 2 to twist in the outer part 3, which results from the torques that occur, is counteracted according to the present invention by the bearing geometry selected, in which both the outer contour of the inner part 2 of the bearing and the outer part 3 of the bearing expand conically, as is apparent from FIG. 1. As is illustrated in FIG. 3, the geometry according to the present invention results in a supporting action to absorb the torques that act.

The height 13 of the elastomer 7 at a given axial location is determined by the slope angles $\beta$ and $\omega$, which are to be selected for the conical expansion of the inner part 2 and the outer part 3, respectively. It is therefore particularly useful for the slope angle $\beta$ for the conical expansion of the inner part 2 to be smaller than the slope angle $\chi$ of the outer part 3. In the case of such a geometry, the height 13 of the rubber is increased in the outer area of the bearing located opposite the pivot pin 6, which takes into account the wide spring excursions present here in a favorable manner and is favorable for the absorption of the strong forces that act. However, it is also possible to vary the slope angles $\beta$, $\omega$ in individual areas of the axial extension of the bearing and thus to specially adapt the height 13 of the elastomer 7 to the stresses on the bearing in the particular specific application.

Figure 4:
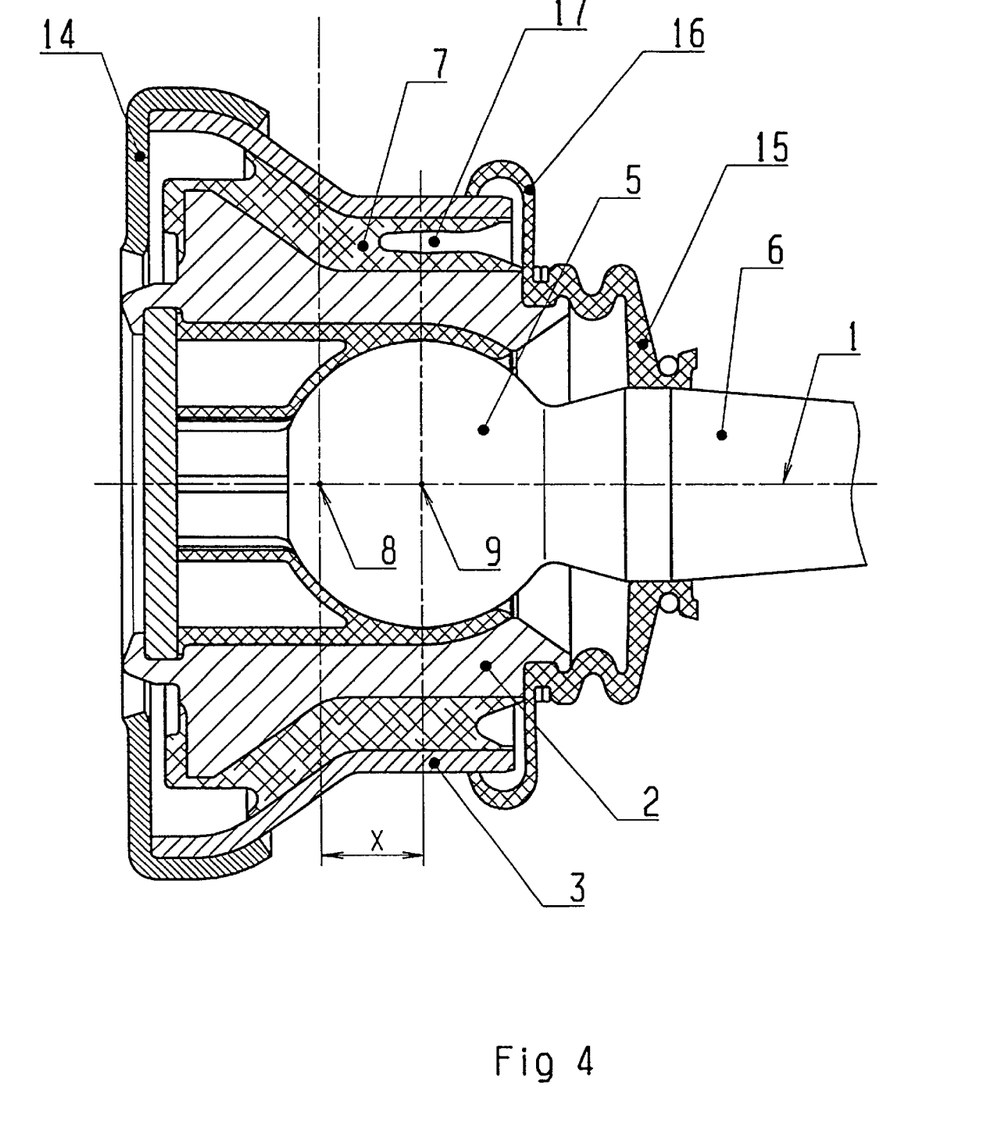
FIG. 4 is a sectional representation showing an embodiment of the bearing according to FIG. 1 with a cover closing the bearing on the side opposite the pivot pin and with a sealing bellows.

FIG. 4 shows another possible embodiment of a ball-and-socket joint according to the present invention with a design closed on the side opposite the pivot pin 6. The bearing is provided with a cover 14 on the front side here. As a result, it is also achieved, besides the prevention of the penetration of contaminants into the bearing, that axial forces can be absorbed in opposite directions.

Corresponding to the application, it is also conceivable to provide a conical expansion of the bearing in the area of the joint ball 5, i.e., on the side of the pivot pin. However, it is also possible for reasons of assembly to select the maximum external diameter of the inner part 2 to be greater than the minimum internal diameter of the outer part 3, because a split mount would otherwise have to be used for the bearing. Another possibility is to provide interruptions or recesses 17 in the elastomer 7 in some areas and thus to adapt the height 13 of the rubber to the forces that occur in a manner that is favorable for the application. Moreover, a sealing bellows 15 may be provided on the side on which the pin exits in an embodiment of the rubber-mounted ball-and-socket joint according to the present invention corresponding to the representation in FIG. 4, where the said sealing bellows is in contact with the pivot pin 6, on the one hand, and with a groove of the inner part 2, on the other hand, and which has an additional sealing bellows extension 16, which is made integrally and preferably in one piece with the sealing bellows 15. The sealing bellows extension 16 is sealingly in contact with the outer part 3 on the end side.

FIG. 5 shows once again the geometry of another bearing according to the present invention on the basis of a sectional representation with a section through the bearing axis 1. With the joint ball 5 provided at its end, a pivot pin 6 is mounted in the bearing shell 4 of the inner part 2 of a rubber-metal bearing. This inner part2 forms the housing of the ball-and-socket joint at the same time. An elastomer 7 is inserted in the known manner between the inner and outer parts 2, 3 of the bearing. The pivot pin 6 of the ball-and-socket joint can pivot out at an angle $\alpha$ corresponding to the forces acting on it radially. To preserve the value of the pivot-out angle $\alpha$, an extension of the bearing cannot be considered on the side of the pivot pin 6. The bearing according to the present invention was therefore extended on the side opposite the projecting pivot pin 6. In the embodiment of a bearing according to the present invention shown in FIG. 5, a soft elastic insert 18 is inserted into the elastomer, which comprises a ring-shaped component in this case, on the side of the pivot pin 6. This insert may have additional recesses 18.1, not shown in FIG. S. To prevent a spontaneous 15, separation of the insert mainly in the axial direction, a material accumulation 19 in the form of a circular ring bead, which engages a complementary shaped recess 20 of the insert 18, is additionally formed in the elastomer. The ring-shaped insert 18 is chamfered axially on the inside in the embodiment of a bearing according to the present invention shown in FIG. 5, so that assembly is facilitated as a result. The bearing geometry according to the present invention leads to a uniform stress distribution in the elastomer 7 with respect to the radial forces that act.

Figure 5:
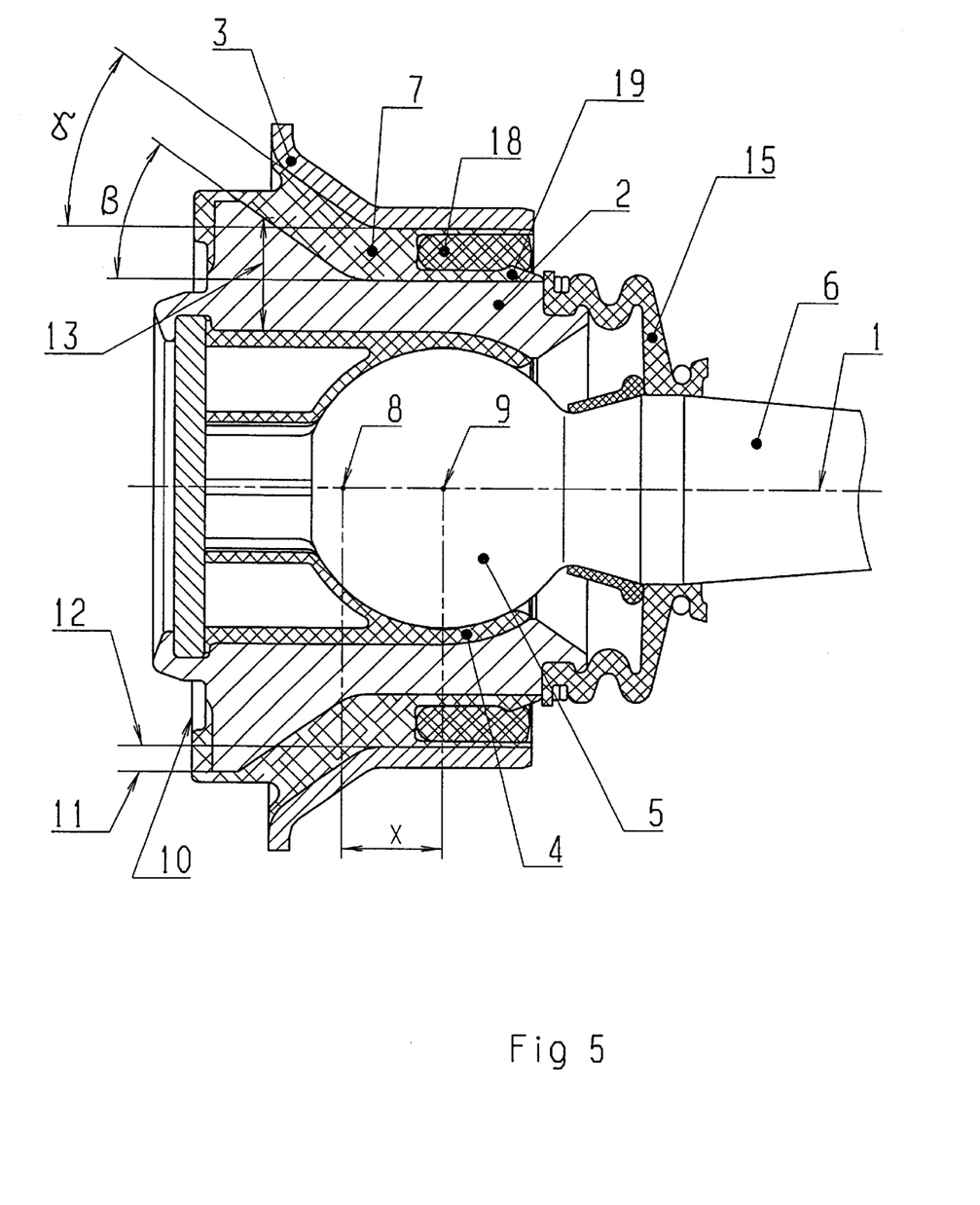
FIG. 5 is a sectional representation of another ball-and-socket joint according to the present invention.
Figure 6:
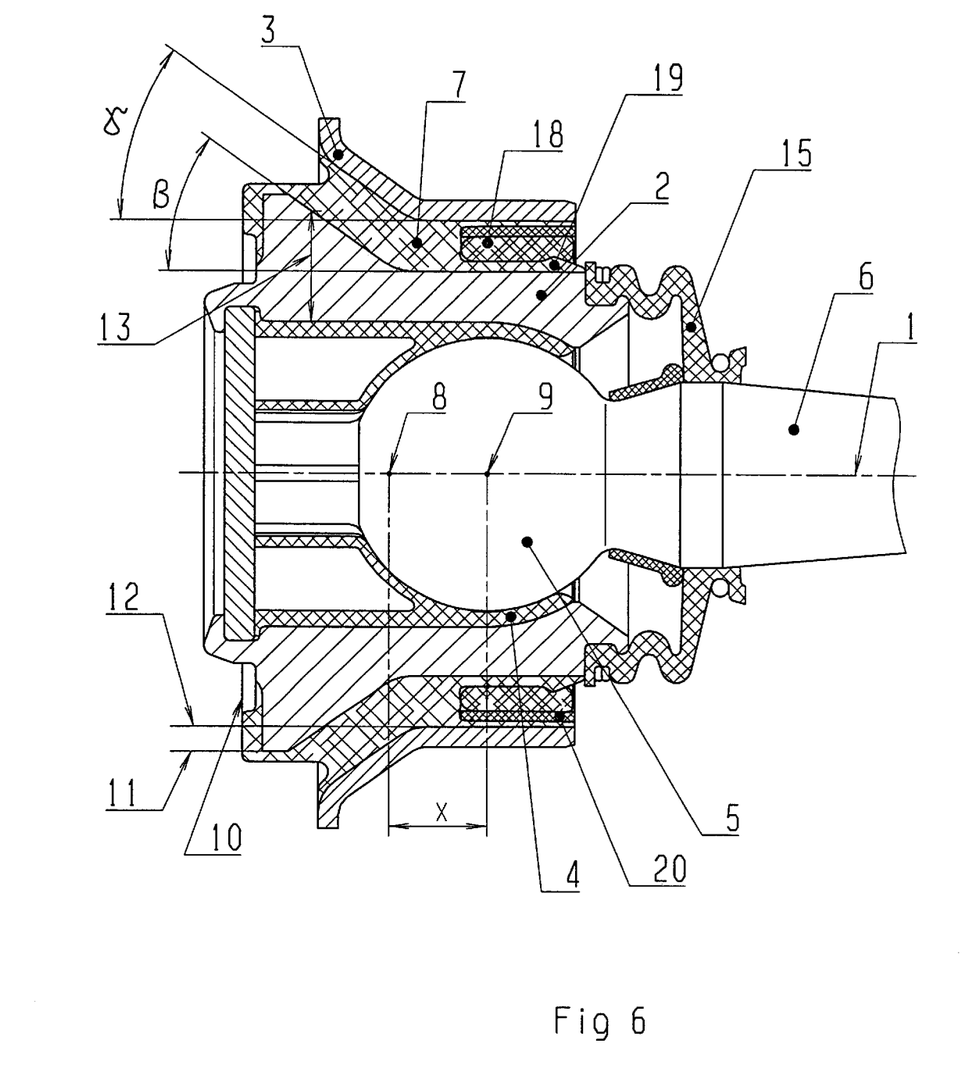
FIG. 6 is a sectional representation of another ball-and-socket joint according to the present invention.

Moreover, FIG. 6 shows an embodiment that is extensively of the same design as that shown in FIG. 5. However, contrary to the above-described variant, the insert 18 comprises two components, wherein the layer 20 on the side cooperating with the elastomer has a roughness that leads to a frictional engagement between the elastomer 7 and the insert 18, so that the insert is secured against spontaneous separation in its mount.

While specific embodiments of the invention have been shown and described in detail to illustrate the application of the principles of the invention, it will be understood that the invention may be embodied otherwise without departing from such principles.

What is claimed is:

1. A rubber-mounted ball-and-socket joint with stress-optimzed bearing geometry, the ball-and-socket joint comprising:
   an axially symmetrical bearing with a bearing axis and with an inner part and an outer part;
   a pivot pin mounted in said inner part with a joint ball provided at one end of said pivot pin, said bearing having an extension, extending beyond the radius of said joint ball on a side located opposite said pivot pin and having a fulcrum point, said pivot pin projecting from said bearing, said mounted pivot pin having a fulcrum point offset in an axial direction in relation to said bearing fulcrum point, wherein an outer contour of said inner part of said bearing is conically expanded with a slope angle $\beta$ with respect to said bearing axis outer contour and an inner contour of said outer part are conically expanded with a slope angle $\chi$ with respect to said bearing axis on a side of the extension of said bearing;
   an elastomer arranged between said conically expanded inner part and said conically expanded outer part.

2. The rubber-mounted ball-and-socket joint in accordance with claim 1, wherein said outer contour of said inner part expands conically in said direction of said bearing extension beginning approximately in an area of said fulcrum point of said bearing.

3. The rubber-mounted ball-and-socket joint in accordance with claim 1, wherein said slope angle β of said conical expansion of said outer contour of said inner part is smaller than said slope angle χ of said conical expansion of said outer part.

4. The rubber-mounted ball-and-socket joint in accordance with claim 1, wherein one of said slope angle β of said conical expansion of said outer contour of said inner part and said slope angle χ of said conical expansion of said outer part vary from one area to a next area.

5. The rubber-mounted ball-and-socket joint in accordance with claim 1, wherein recesses are provided in some areas of said elastomer disposed between said inner part and said outer part, said elastomer is arranged fully between said conically expanded inner contour and said conically expanded outer contour.

6. The rubber-mounted ball-and-socket joint in accordance with claim 1, wherein flat or plane areas are present in at least some sections on one of said inner part and said outer part.

7. The rubber-mounted ball-and-socket joint in accordance with claim 1, wherein on a front side of said bearing located opposite said projecting pivot pin, a stop face is provided for said inner part to absorb forces acting axially.

8. The rubber-mounted ball-and-socket joint in accordance with claim 1, wherein said inner part and said outer part of said bearing are also conically expanded on a side of said pivot pin.

9. The rubber-mounted ball-and-socket joint in accordance with claim 1, further comprising: a sealing bellows on at least one side of the ball-and-socket joint, said sealing bellows sealingly closing the ball-and-socket joint.

10. The rubber-mounted ball-and-socket joint in accordance with claim 1, wherein said sealing bellows has a sealing bellows extension made in one piece with it.

11. The rubber-mounted ball-and-socket joint in accordance with claim 1, further comprising an insert with a Shore hardness lower than that of said elastomer, said insert being inserted into said elastomer on at least one side of the ball-and-socket joint.

12. The rubber-mounted ball-and-socket joint in accordance with claim 11, wherein a plurality of inserts are arranged distributed over the circumference of said elastomer.

13. The rubber-mounted ball-and-socket joint in accordance with claim 11, wherein said insert is vulcanized or bonded into said elastomer.

14. The rubber-mounted ball-and-socket joint in accordance with claim 11, wherein said insert is inserted into said elastomer.

15. The rubber-mounted ball-and-socket joint in accordance with claim 14, wherein said insert comprises a plurality of components of different roughness.

16. The rubber-mounted ball-and-socket joint in accordance with claim 14, wherein said insert is secured in said elastomer by a securing element against separation.

17. The rubber-mounted ball-and-socket joint in accordance with claim 16, wherein the securing element has a wedge shape and is inserted between said insert and said elastomer.

18. The rubber-mounted ball-and-socket joint in accordance with claim 11, wherein said insert has a recesses at least in some areas.

19. The rubber-mounted ball-and-socket joint in accordance with claim 11, wherein said insert is chamfered at least on its edge area on the inside of the joint.

20. A rubber-mounted ball-and-socket joint with stress-optimized bearing geometry, the ball-and-socket joint comprising:

an axially symmetrical bearing with a bearing axis and with an inner part, an outer part and an elastomer, said inner part being inflated against said outer part by said elastomer;

a pivot pin mounted in said inner part with a joint ball provided at one end of said pivot pin, said bearing having an extension, extending beyond the radius of said joint ball on a side located opposite said pivot pin and having a fulcrum point, said pivot pin projecting from said bearing, said mounted pivot pin having a fulcrum point offset in an axial direction in relation to said bearing fulcrum point, wherein an outer contour of said inner part of said bearing is conically expanded with a slope angle β with respect to said bearing axis, an outer contour and an inner contour of said outer part are conically extend with a slope angle χ with respect to said bearing axis on a side of the extension of said bearing, a maximum external diameter of said inner part being larger than a minimum internal diameter of said outer part.

21. A ball joint comprising:

a pivot pin including a joint ball;

a bearing inner part surrounding said joint ball, said pivot pin being movable in said bearing inner part and one end of said pivot pin extending from a first end of said bearing inner part, said bearing inner part having a second end diametrically opposite said first end, said bearing inner part having a radially outer contour, said outer contour conically expanding toward said second end;

a bearing outer part surrounding said bearing inner part, said bearing outer part having first and second ends adjacent said first and second ends of said bearing inner part respectively, said bearing outer part having an inner contour conically expanding toward said second end;

an elastomer arranged between said bearing inner part and said bearing outer part.

22. A ball joint in accordance with claim 21, wherein:

said elastomer fully extends between said conically expanding outer contour and said conically expanding inner contour.

23. A ball joint in accordance with claim 21, wherein:

said conically expanding outer contour and said conically expanding inner contour extend toward said second end beyond said joint ball.

24. A ball joint in accordance with claim 21, wherein:

said conically expanding outer contour and said conically expanding inner contour have substantially straight sides in cross section.

* * * * *